(12) United States Patent
Fauteux et al.

(10) Patent No.: US 10,923,693 B2
(45) Date of Patent: Feb. 16, 2021

(54) BATTERY PACK

(71) Applicant: TTI (MACAO COMMERCIAL OFFSHORE) LIMITED

(72) Inventors: Denis Gaston Fauteux, Hong Kong (CN); Jiang Zhao, Guangdong (CN); Jian Guo Zhao, Guangdong (CN); Yuan Bai Wu, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 94 days.

(21) Appl. No.: 16/072,358

(22) PCT Filed: Jul. 28, 2017

(86) PCT No.: PCT/CN2017/094937
§ 371 (c)(1),
(2) Date: Jul. 24, 2018

(87) PCT Pub. No.: WO2018/024163
PCT Pub. Date: Feb. 8, 2018

(65) Prior Publication Data
US 2019/0081290 A1    Mar. 14, 2019

(30) Foreign Application Priority Data
Aug. 4, 2016   (CN) ..................... 2016 2 0839421 U

(51) Int. Cl.
*H01M 2/10* (2006.01)
*H01M 2/20* (2006.01)
(Continued)

(52) U.S. Cl.
CPC ....... *H01M 2/1016* (2013.01); *H01M 2/0217* (2013.01); *H01M 2/105* (2013.01);
(Continued)

(58) Field of Classification Search
None
See application file for complete search history.

(56) References Cited

U.S. PATENT DOCUMENTS 5,308,715 A    5/1994  Aronne
2004/0257033 A1*  12/2004  Kubota ............... H01M 2/1016
                                              320/107

(Continued)

FOREIGN PATENT DOCUMENTS

CN    105576725 A    5/2016
CN    205985178 U    2/2017

OTHER PUBLICATIONS

TTI (Macao Commercial Offshore) Limited; Extended European Search Report for EP Patent Application No. EP17836345; dated Jul. 9, 2019; (2 pages).

(Continued)

Primary Examiner — Karie O'Neill Apicella
(74) Attorney, Agent, or Firm — Dority & Manning, P.A.

(57) ABSTRACT

A battery pack (20), which includes: a housing; a frame disposed inside the housing; and two or more cells (32) mounted to the frame. The two or more cells (32) are connected with each other through a configurable connector (52). The configurable connector (52) is suitable to connect or disconnect an electrical connection between the two or more cells (32). Wherein the configurable connector (52) includes a user contactable switch (22) located on an outer surface (21) of the housing. The user contactable switch (22) is configured to move within a plane parallel to the outer surface (21), such that the contactable connector (52) is switched between a first state and a second state. In the first state, the electrical connection exists between the two or more cells (32); in the second state, the electrical connection does not exist between the two or more cells (32). Therefore, the battery pack (20) may disconnect a connection of the (Continued)

internal circuit thereof in non-use state, such as shipping and storing, such that the battery pack (20) can disconnect its internal circuit in the non-use state such as transportation and storage, such that the loss caused by the self-discharging may be minimized and the safety hazard may be avoided at the same time.

6 Claims, 4 Drawing Sheets

(51) Int. Cl.
   *H01M 10/42*   (2006.01)
   *H01M 2/02*   (2006.01)
   *H01M 2/30*   (2006.01)

(52) U.S. Cl.
   CPC ............ *H01M 2/204* (2013.01); *H01M 2/30* (2013.01); *H01M 10/425* (2013.01); *H01M 2220/30* (2013.01)

(56) References Cited

U.S. PATENT DOCUMENTS

| | | | |
|---|---|---|---|
| 2006/0132090 A1* | 6/2006 | Suzuki | H01M 2/34 320/112 |
| 2012/0058382 A1 | 3/2012 | Carignan et al. | |
| 2015/0136504 A1* | 5/2015 | Tsujimura | B60K 1/04 180/68.5 |

OTHER PUBLICATIONS

K. Amazon: "erenLine Batteriehalter fur 3x Mignon AA; geschlossenes Gehause mit EIN/Aus—Schalter", Apr. 16, 2016, XP055603226; https://www.amazon.de/Batteriehalter-geschlossenes-Aus-Schalter-Batterie-Fach-Batteriekasten/dp/B07K5J389T.

TTI (Macao Commercial Offshore) Limited; Office Action for corresponding AU Patent Application No. AU2017306457; Nov. 6, 2019; (2 pages).

4 x AA Biittery Holder with On/Off Switch [retrieved from internet on Nov. 4, 2019] <URL: https://web.archive.org/web/20160329142251/ https://www.adafruit.com/product/830> published on Mar. 29, 2016 as per Wayback Machine.

TTI (Macao Commerical Offshore) Limited; International Patent Application No. PCT/CN2017/094937; International Search Report; dated Nov. 9, 2017; (2 pages).

* cited by examiner

BATTERY PACK

This application is a National Stage Patent Application of PCT/CN2017/094937, filed on Jul. 28, 2017, which claims the benefit of priority to Chinese Patent Application No. 201620839421.8, filed on Aug. 4, 2016, the disclosures of all of which are incorporated by reference herein in their entireties.

BACKGROUND

Technical Field

The present invention is related to a power energy storage device, and more particularly to a battery pack with a plurality of cells.

Related Art

Battery packs are often used in portable electronic devices and power tools, such that these devices and tools may be used in environments without available fixing power. For example, the power tool manufacturers often produce battery packs that are compatible with power tools and may be used in different types of power tools, such as electric drills, hammers, electric screwdrivers, corner grinders, etc. The battery pack usually includes a plurality of individual batteries or say battery cells mounted in the housing. Through a mechanical locking structure configured on the housing of the battery pack, the user may easily mount the entire battery pack to the power tool, or remove it from the power tool.

However, traditional battery packs are often manufactured in the factory to be immediately usable. That is, before the battery pack is shipped or sold, the battery pack has been fully assembled and is ready for use. When the battery pack is received, the end user may immediately insert the battery pack into the electronic device to begin using the electronic device. The battery pack manufactured in this way is undoubtedly convenient for users since there is no additional setup procedure on the client side before starting to use the battery pack. However, on the other hand, the problem of the battery pack is that once it is manufactured in the factory, the battery pack may start self-discharging, ultimately causing power consumption of the initial energy in the battery pack and reducing the battery lifetime. Additionally, in the transport regulation of many countries, the battery capacity is also prescribed to be not exceeding a certain standard, otherwise it may lead to the risk of accident, such as explosion during transportation, etc. An entire battery pack may easily has a capacity which exceeds such standards.

SUMMARY

Accordingly, embodiments of the present invention provide a battery pack, which overcomes or at least alleviates the above technical problem.

One aspect of the present invention is to provide a battery pack, which includes: a housing; a frame disposed inside the housing, and two or more cells mounted to the frame. The two or more cells are connected with each other through a configurable connector. The configurable connector is suitable to connect or disconnect an electrical connection between the two or more cells. The configurable connector includes a user contactable switch located on an outer surface of the housing. The user contactable switch is configured to move within a plane parallel to the outer surface, such that the contactable connector is switched between a first state and a second state. In the first state, the electrical connection exists between the two or more cells; in the second state, the electrical connection does not exist between the two or more cells.

Preferably, the contactable connector includes two terminals and an intermediate conductor simultaneously contacted with or separated from the two terminals. The intermediate conductor is fixed to the user contactable switch. The terminals are respectively connected to one of the two or more cells. When the intermediate conductor is not contacted with the terminals, the electrical connection does not exist between the terminals, such that the configurable connector is at the second state. When the intermediate conductor is contacted with the terminals, the terminals are connected with each other through the intermediate conductor, such that the configurable connector is at the first state.

More preferably, the two terminals are two metal pins configured to be arranged parallel to each other. The metal pins are elastic. The intermediate conductor includes a metal sheet capable of being removably inserted between the metal pins and simultaneously contacted with the metal pins.

In one variant embodiment, the user contactable switch further includes an indicator. The indicator is aligned with different signs on the outer surface as the movement of the user contactable switch, so as to indicate a connection state of the two or more cells In another variant embodiment, the battery pack further includes a circuit board. The two terminals of the configurable connector are fixed on the circuit board.

In another variant embodiment, the intermediate conductor is biased to a position separated from the two terminals through a biasing element.

In another variant embodiment, the battery pack includes a plurality of configurable connectors; the plurality of configurable connectors has a plurality of corresponding intermediate conductors, and the plurality of intermediate conductors is connected to the user contactable switch.

Therefore, the present invention provides many advantages. When a battery pack according to the present invention is manufactured at a factory, it is not in a usable state. The non-use state continues, for example, during the storage process of the store, during the shipping process, during the sale of the battery pack in the store, and even after the user finally purchases the power tool with the suitable battery pack or separately purchases the battery pack, but he/she does not open the packaging of the battery pack and the battery pack is left idle. At the time the user switches the sliding switch located on the housing so that the electrical connection between the cells insides the battery pack changes to a connecting state from a disconnecting state, the battery pack enters the usable state, the circuit inside the entire battery pack is conducted and the battery pack becomes ready for use. Therefore, before the user operates the sliding switch on the housing of the battery pack, the circuit inside the battery pack is actually not connected, or "turned off", such that the self-discharge effect due to the connection of the plurality of cells is eliminated. On the other hand, the battery pack of the present invention is easy and convenient for the user to use, since the user only needs to slide the switch before using it, without having to touch the internal components of the battery pack or to perform any complicated procedure. This will not cause any difficulty for the average users.

A further advantage of the present invention is that for the user, the only exposed parts of the configurable connector is the user contactable switch, and other parts of the configurable connector, and in particular the metal pins and intermediate conductors which have electricity are located inside the housing of the battery pack. In this way, the user will not has the risk of suffering an electric shock or accidentally causing a short circuit inside the battery pack since outside objects such as fingers may not reach the space inside the housing of the battery pack. Therefore, the safety of the battery pack is greatly guaranteed. Additionally, since the entire configurable connector is integrated on the battery pack and does not contain any removable or external components, it is convenient for the user and the user does not need to worry about that the battery pack is inoperable if one or more components are missing for example due to the transportation of the battery pack. Similarly, the user does also not worry about that a component is lost or may not found when the battery pack is configured to the non-use state (such as idle) by the user itself.

BRIEF DESCRIPTION OF THE DRAWINGS

By referring to the remainder of the specification and the drawings, it is possible to further understand the performance and advantages of the present invention. The same components in the drawings are indicated with the same numerals. In some cases, the sub sign is placed after a reference number and a hyphen to represent one of many similar components. When a reference number is mentioned but not specifically stated an existing sub sign, it refers to all similar components.

FIGS. 6a and 6b show a schematic view of a terminal contacting of the user contactable switch of the battery pack in FIG. 1 in a connection state and a disconnection state, respectively, wherein FIG. 6a corresponds to the state of FIG. 5b, and FIG. 6b corresponds to the state of FIG. 5a.

DETAILED DESCRIPTION

Embodiments of the present invention use a sliding switch to promote a reconfigurable process of the connecting and disconnecting of the internal circuit of the battery pack. Other benefits and advantages provided by various embodiments of the present invention may be easily understood from the following description.

Figure 1:
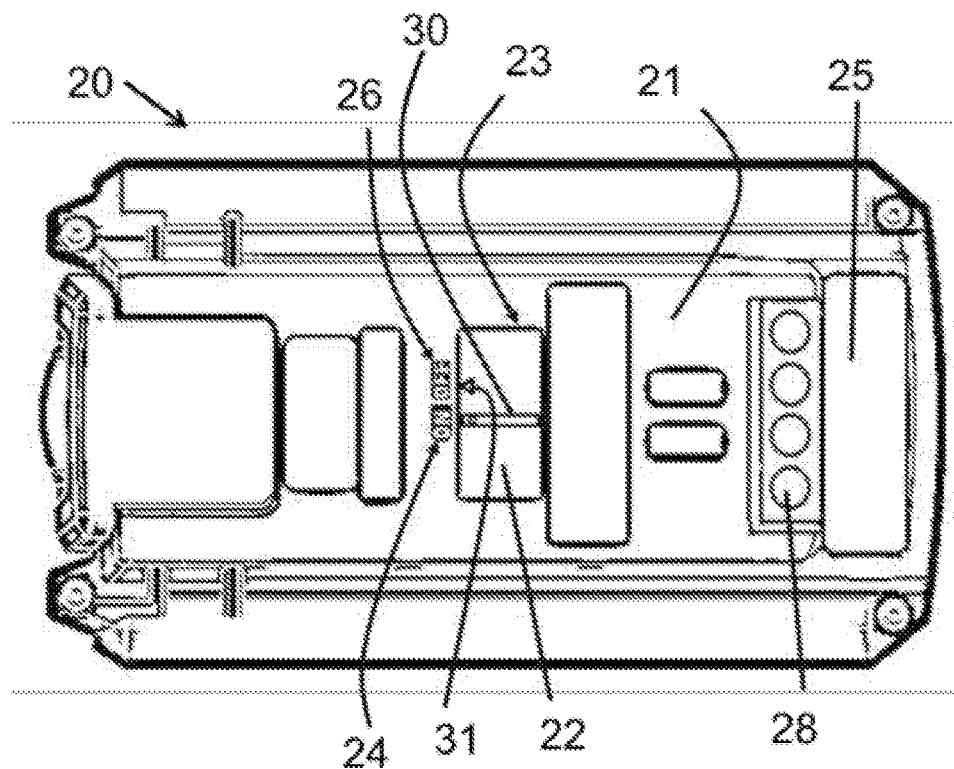
FIG. 1 is a top view of a battery pack according to an embodiment of the present invention, wherein a top portion of a battery pack having terminals and switches is shown.

Please refer to FIG. 1, according to a first embodiment of the present invention, a battery pack 20 is a power tool battery pack, which may be mounted to or removed from one or more power tool bodies (not shown). Alternatively, the battery pack 20 may also be independently mounted on a battery charger (not shown) for charging. The battery pack 20 has a substantially cuboid shape, and a top surface 21 of the housing thereof is shown in FIG. 1 Herein, the top surface 21 means that an outer surface of the battery pack 20 connected to more outer components. Specifically, four signs 28 of four interface terminals (not shown) corresponding to the battery pack 20 is shown in FIG. 1. These interface terminal may be contacted with the corresponding electrical terminals of the above-mentioned power tool or charger and transmit electric power or signals. Although not shown in FIG. 1, in the direction from top to bottom in the figure, the four interface terminals correspond to four signs 28, i.e., "+", "T2", "T1", "−". Wherein "+" and "−" are power terminals for outputting power, and "T2" and "T1" are terminals for signal or control. These interface terminals are actually located under the covering plate 25 of the top surface 21, therefore allowing corresponding terminals of the external chargers or power tools to be inserted under the covering plate 25 along a direction parallel to the paper plane in FIG. 1 and be connected to the interface terminal of the battery pack 20.

In addition, there is a user contactable switch on the top surface 21, in particular a sliding switch 22. The sliding switch 22 has a substantially sheet-like shape, and is partially exposed to an opening 23 on the top surface 21. On the surface of the sliding switch 22, a protruding rib 30 is configured as a portion for pulling the sliding switch 22 by the user, and a triangle 31 is configured as an indicator. The protruding rib 30 may be moved left and right between the two positions in a horizontal plane (i.e., parallel to the plane of a circuit board 34 and the top surface 21). The triangle 31 is respectively aligned with a word ON 24 and a word OFF 26 labeled on the top surface 21 with the movement of the sliding switch 22. The words ON 24 and OFF 26 may be printed directly on the top surface 21 or as an independent sign, for example, to be adhered to the top surface 21. The protruding rib 30 may be pulled directly by the user, thereby causing the sliding switch 22 to move together.

Figure 2:
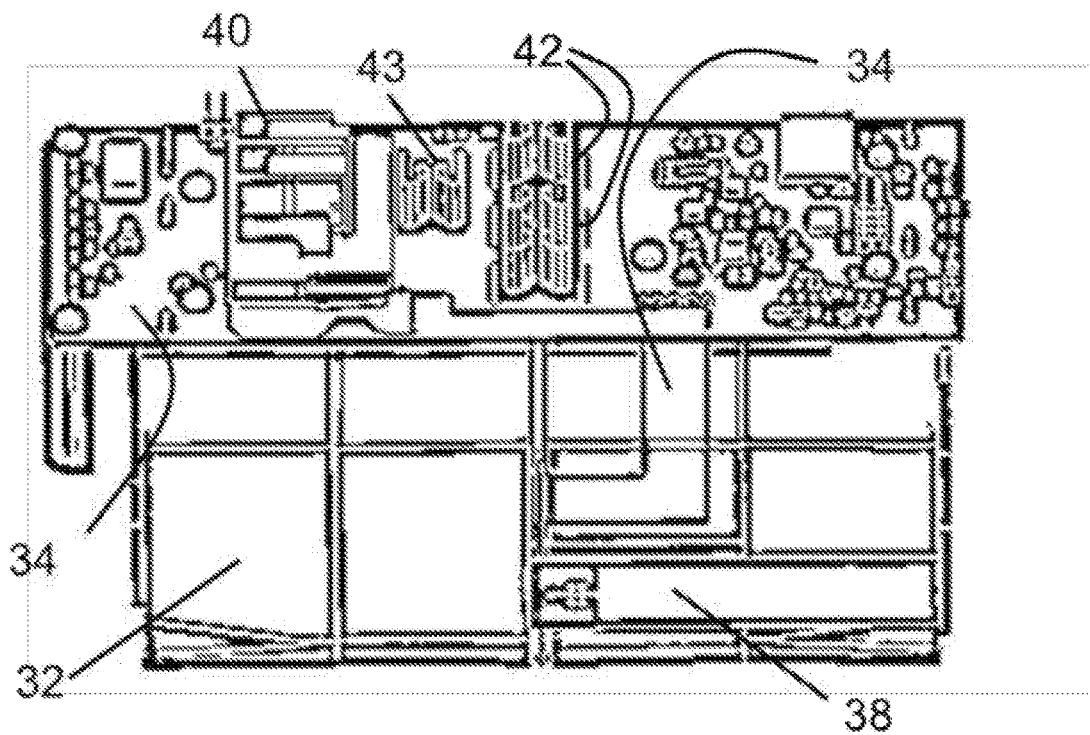
FIG. 2 is a perspective view of a circuit board and internal battery units of the battery pack shown after removing the housing in FIG. 1.

Refers to FIG. 2, an interior of the battery pack 20 has a plurality of cells 32 connected with each other, and each of the plurality of the cells 32 has a substantially cylindrical shape. Different cells 32 are electrically connected through connecting strips 38 made of the metal. However, it should be noted that not all of the cells 32 are connected with each other through the connecting strips 38. On the contrary, the connecting strips 38 are only used to connect to a part of cells 32. For example, all cells 32 are divided into some groups (not shown). The cells in each group are permanently connected through the connecting strips and the electrical connection does not permanently exist between the different groups. On the contrary, the connection between the group and the group needs to be achieved with a configurable connector, which will be explained in more details below.

A circuit board 34 covers the top of all cells 32, and the circuit board 34 has a length and a width which are approximately equal to the length and width of the entire battery pack 20. Four interface terminals 40 as mentioned above are fixed on the circuit board 34, and these terminals 40 extend upwardly and horizontally from the circuit board 34 in a L-shape.

Some connector terminals 42 and a switching terminal 43 are also fixed on the circuit board 34. These connector terminals 42 are parts of the configurable connector in this embodiment. Different from the interface terminal 40, the connector terminals 42 are not used to connect to external devices, but rather are used to disconnect or connect internal circuits of the battery pack 20. The above groups of different unit cells 32 are connected to the connector terminals 42 through a connecting strip 34.

Figure 3:
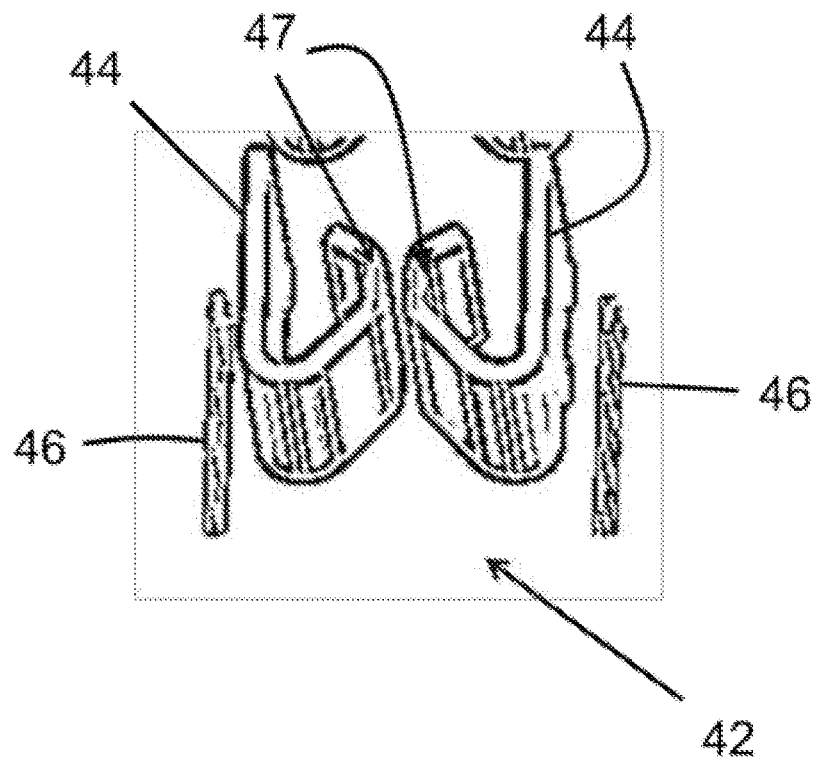
FIG. 3 is an enlarged view of the terminals of the configurable connector of the battery pack in FIG. 2.

FIG. 3 shows a structure of one above-mentioned connector terminal 42. Each terminal 42 includes two pins 44 arranged parallel to each other and spaced apart from each other. Each pin 44 has a substantially hook-like shape. A bending of the hook shape occurs in a horizontal plane. A bending portion 47 near the end of the hook is the closest portion between the two pins 44. However, in normal cases, they are not contacted to enable electrical connection, but there is a certain gap between the two pins 44. Each pin 44 is connected to the above-mentioned connecting strip 34 through the adjacent pin thereof 46. The pins 46 are soldered to the circuit board 34. The connection of the pin 44 and the pin 46 are located under the circuit board 34, and that it why the connection is not shown in FIG. 3. Additionally, the pin 44 is elastic because it is formed by bending a thin metal sheet. The structure of the switching terminal 43 and the structure of the connector terminal 42 are identical, and they are just different in intended use.

Additionally, although not shown in FIGS. 1 to 3, a plurality of intermediate conductors is fixedly connected under the sheet-like sliding switch 22, and in particular a plurality of metal contacts. With the movement of the sliding switching 22, these metal contacts also move left and right in the horizontal plane, so as to be selectively contacted with or departed from the plurality of terminals 42 at the same time. The sliding switch 22 also has a metal contact to contact with or detach from the terminal 43.

Figure 4:
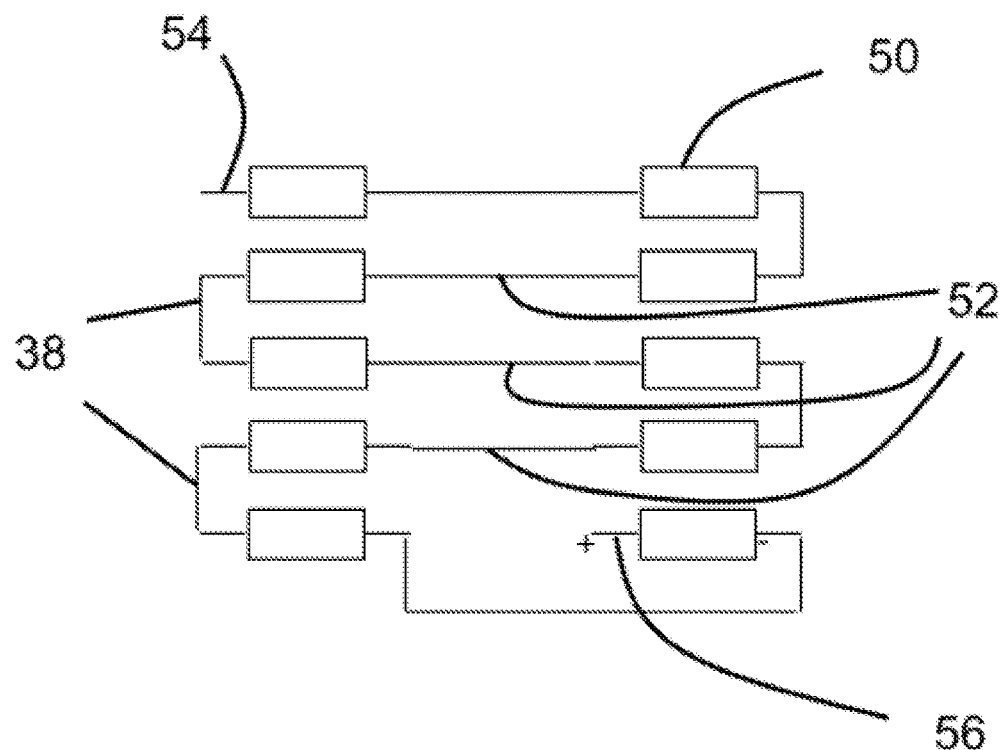
FIG. 4 is a circuit connection diagram of a cell inside the battery pack according to an embodiment of the present invention.

FIG. 4 is an internal circuit diagram of a battery pack according to an embodiment of the present invention. A plurality of cells (not shown) is divided into different groups 50, and the total number of the groups 50 is ten, as shown in FIG. 4. Some of the groups 50 are permanently electrically connected through the above-mentioned connecting strip 38, and some of the groups 50 are connected to each other through configurable connectors 52. The configurable connectors 52 include the above-mentioned intermediate conductors, connector terminals, etc. Output terminals of the internal circuit of the entire battery pack are respectively a negative electrode 54 and a positive electrode 56, and the negative electrode 54 and the positive electrode 56 are used to connect to external devices, such as battery chargers or power tools, etc. Since the configurable connectors 52 may selectively be at a connecting or a disconnecting state of a electric connection, the entire circuit as shown in FIG. 4 is formed as a closed loop in the connection state, such that the power tool connected to the battery pack may obtain a current outputted by the battery pack, and a charger connected to the battery pack may input the circuit to the battery pack. On the contrary, the entire circuit does not form a closed loop in the disconnecting state, such that the power tool connected to the battery pack may not obtain the current outputted by the battery pack, and the charger connected to the battery pack may not input the circuit to the battery pack.

Figure 5A:
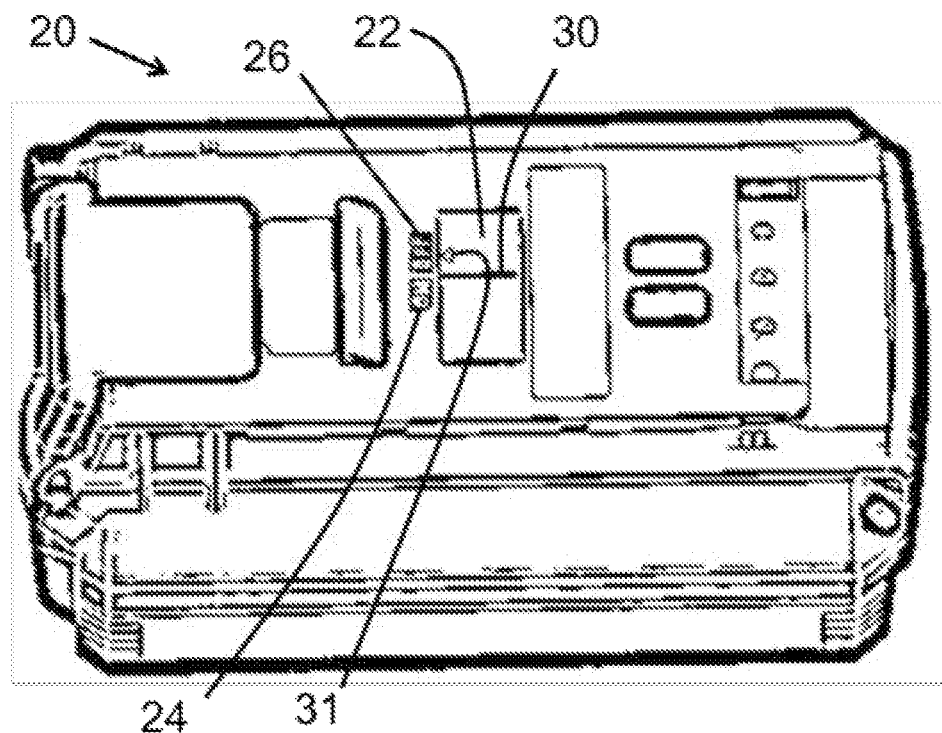
FIGS. 5a and 5b show an external perspective view of a user contactable switch of the battery pack in the FIG. 1 in OFF state and ON state, respectively.
Figure 5B:
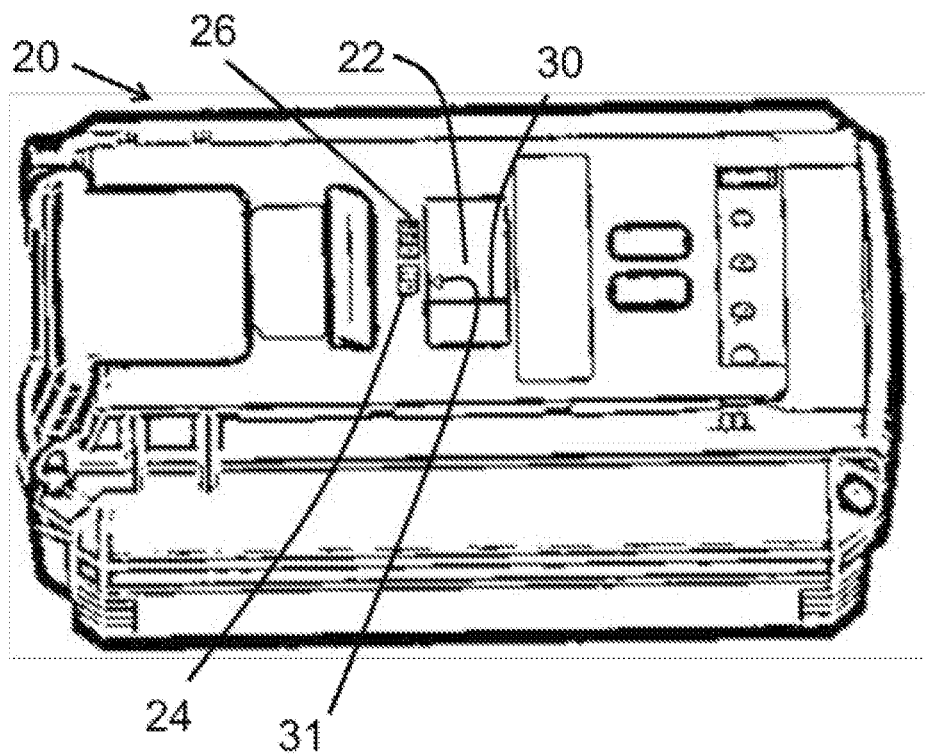

After the structure of the battery pack in FIGS. 1 to 3 is described, the using method of the battery pack 20 will be described next with reference to FIGS. 5a to 6b. In FIG. 5a, it is shown that the appearance of the battery pack 20 is in states such as storage, transportation, out-of-factory, etc., and the configurable connector is in a second state. Specifically, under the second state, the sliding switch 22 is located at a rightward position (in the width direction of the battery pack 20) between the two positions where it may reach. Therefore, at this time, the triangle 31 points to the words OFF 26, which prompts the user that the battery is in a non-operating state at this time. FIG. 6b shows an internal state of the configurable connector in this state. At this time, the metal contact 58 arranged under the sliding switch 22 does not contact with the pin 44 of the corresponding connector terminal 42 thereof and is departed therefrom with a certain distance. In this way, the intermediate conductor does not exist between the two opposite pins 44, such that the electrical connection of the configurable connector is in the disconnected state. Therefore, the internal circuit in the entire battery cell is not closedat this time.

When the user finally wants to place the battery pack 20 in a power tool (not shown) to use or place it a charger (not shown) to charge the battery pack 20, then he/she needs to change the state of the configurable connector. Specifically, for the battery pack 20 as shown in FIG. 5a, the user needs to use the finger to pull the protruding rib 30 to the left, such that the sliding switch 22 may also move leftward to the leftward position at the same time. The appearance of the battery pack 20 after pulling is shown in FIG. 5b, where the triangle 31 points to ON 24. At this time, the configurable connector is in the first state.

Figure 6A:
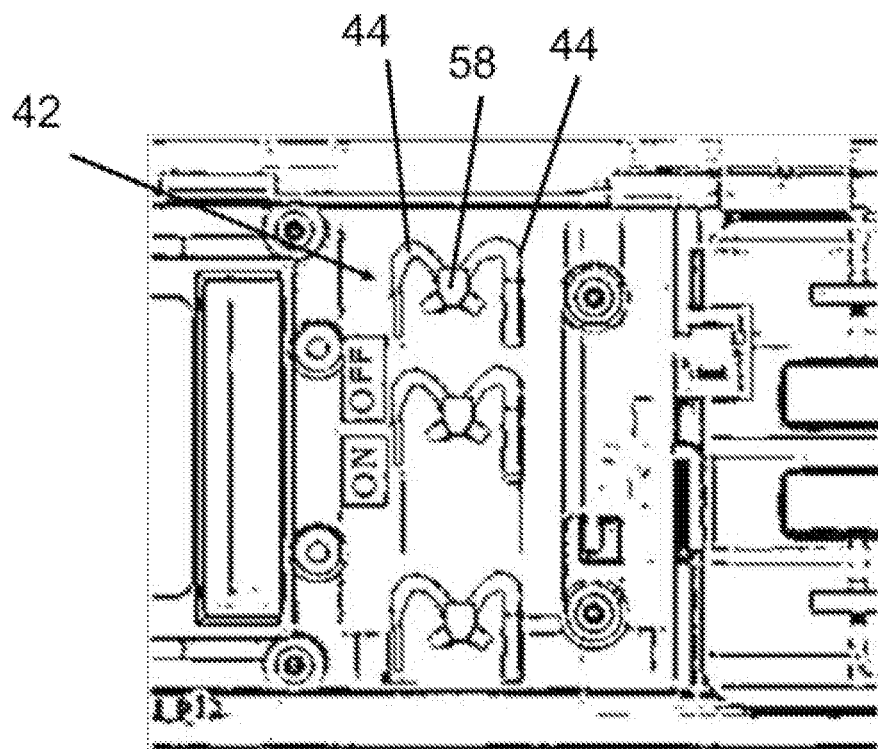
Figure 6B:
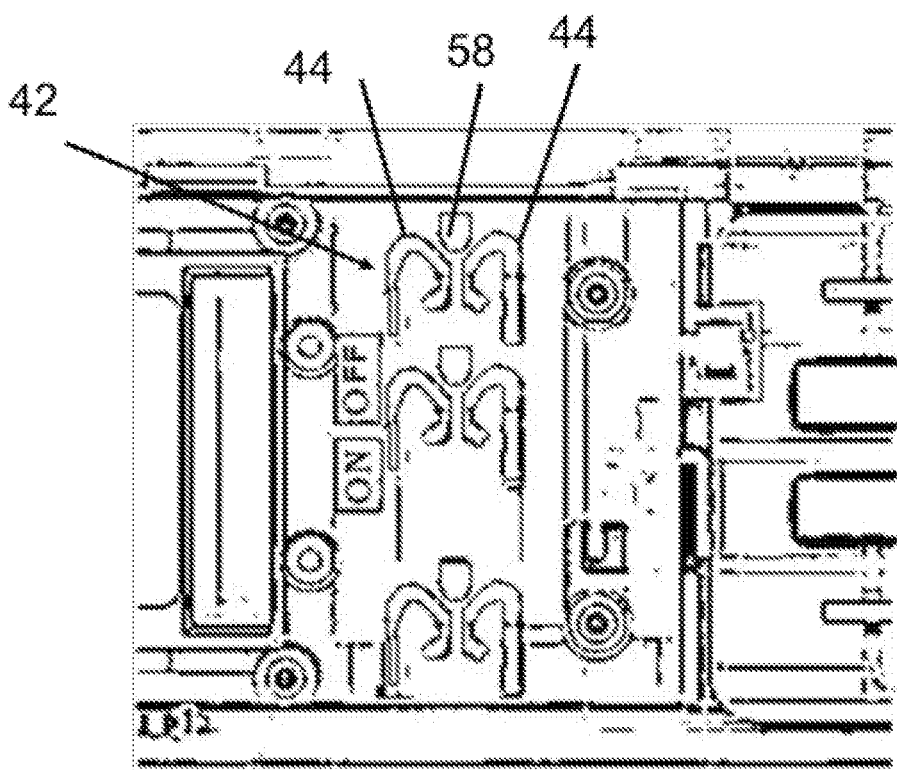

FIG. 6a shows the internal state of the configurable connector in the first state. During the above pulling process, the metal contact 58 arranged under the sliding switch 22 may be moved toward the pin 44 of the corresponding connector terminal 42 thereof (in the downward direction in FIG. 6a) with the leftward movement of the sliding switch 22. The gap existed between the pins 44 is smaller than the width of the metal contact 58, and it is insufficient to accommodate the metal contacts 58. However, when the metal contact 58 moves and are forced to enter into the gap, the metal contact 58 forces the two parallel pins 44 to move apart from each other since the pins 44 are elastic. The separated pin 44 may generate corresponding restoring force acting on the metal contact 58, such that the metal contact 58 is maintained in close contact with the pin 44 and they do not separate easily. In this way, the intermediate conductor formed of the metal contact exists between the two opposite pins 44, such that the electrical connection of the configurable connector is at the connection state. Therefore, the internal circuit in the entire battery pack 20 is fully closed at this time, such that the charging and the discharging of the battery pack 20 is possible.

Therefore, after several embodiments have been described, those skilled in the art should understand that different modifications, additional structures and equivalents may be used without departing from the essence of the present invention. Correspondingly, the above description should not be construed as limiting the scope of the present invention defined in the following claims.

The invention claimed is:

1. A battery pack, comprising:
   a housing;
   a frame disposed inside the housing; and
   two or more cells mounted to the frame, the two or more cells connected with each other through a configurable connector, and the configurable connector being suitable to connect or disconnect an electrical connection between the two or more cells, wherein the configurable connector comprises two terminals and an intermediate conductor simultaneously contacted with or separate from the two terminals;
   wherein the configurable connector comprises a user contactable switch located on an outer surface of the housing; the user contactable switch configured to move within a plane parallel to the outer surface, such that the configurable connector is switched between a first state and a second state; in the first state, the electrical connection existing between the two or more cells; in the second state, the electrical connection not existing between the two or more cells; wherein the intermediate conductor is fixed to the user contactable switch; the terminals respectively connected to one of the two or more cells; when the intermediate conductor is not contacted with the terminals, the electrical connection not existing between the terminals, such that the configurable connector is at the second state; when the intermediate conductor is contacted with the terminals, the terminals being connected with each other through the intermediate conductor, such that the configurable connector is at the first state, and wherein switching between the first state and the second state elastically deforms a portion of the configurable connector.

2. The battery pack according to claim 1, wherein the two terminals are two metal pins configured to be arranged parallel to each other; the metal pins being elastic; the intermediate conductor comprising a metal sheet capable of being removably inserted between the metal pins and simultaneously contacted with the metal pins.

3. The battery pack according to claim 1, wherein the user contactable switch further comprises an indicator; the indicator aligned with different signs on the outer surface with the movement of the user contactable switch, so as to indicate a connection state of the two or more cells.

4. The battery pack according to claim 1, further comprising a circuit board; the two terminals of the configurable connector fixed on the circuit board.

5. The battery pack according to claim 1, wherein the intermediate conductor is biased to a position separated from the two terminals through a biasing element.

6. The battery pack according to claim 1, wherein the battery pack comprises a plurality of configurable connectors; the plurality of configurable connectors has a plurality of corresponding intermediate conductors, and the plurality of intermediate conductors is connected to the user contactable switch.

\* \* \* \* \*